United States Patent [19]

Mui et al.

[11] Patent Number: 4,458,282
[45] Date of Patent: Jul. 3, 1984

[54] MEDIA MODULE

[75] Inventors: Paul K. Mui; James H. Smith; Charles C. Woodard, all of Boise, Id.; Laurence J. Albrecht, Seattle, Wash.

[73] Assignee: Hewlett-Packard Company, Palo Alto, Calif.

[21] Appl. No.: 314,912

[22] Filed: Oct. 26, 1981

[51] Int. Cl.³ .................. G11B 23/02; B65D 85/30
[52] U.S. Cl. .................................. 360/133; 360/97; 206/444
[58] Field of Search .................. 360/133, 97–98; 206/444

[56] References Cited

U.S. PATENT DOCUMENTS

| | | | |
|---|---|---|---|
| 3,643,240 | 2/1972 | Raiser | 360/98 |
| 3,973,273 | 8/1976 | Lissner et al. | 360/98 |
| 4,013,169 | 3/1977 | Cheney | 206/444 |
| 4,233,586 | 11/1980 | Kaplow et al. | 206/444 |
| 4,235,339 | 11/1980 | Christensen et al. | 360/97 |

OTHER PUBLICATIONS

IBM Tech. Disc. Bull., M. H. Bosier, Disk Release Mechanism for Magnetic Disk Cartridge, vol. 22, No. 6, Nov. 1979, pp. 2499–2500.

Primary Examiner—Stuart N. Hecker
Attorney, Agent, or Firm—F. David LaRiviere; William H. MacAllister

[57] ABSTRACT

A module for dust-free containment of rotating data storage media such as disc packs, both in and out of the drive, including top and bottom covers, sliding door access for read/write heads and filtered air, a carrying handle coupled to the media hub for carrying the module and for locking the media in a fixed position within the module while being transported, and a removable chuck plate cover for covering a magnetic chuck plate and for locking the media in a fixed position within the module while being stored.

17 Claims, 16 Drawing Figures

MEDIA MODULE

BACKGROUND AND SUMMARY OF THE INVENTION

Prior art removable multiple disc data storage packs typically are unable to adequately protect the data storage media from dirt and other debris which contaminate the surface of such media, causing data storage error and other operational difficulties. Such contamination usually arises during insertion of the disc pack into and removal thereof from the disc drive. For example, in some top-loading models, the bottom half of a canister-like cover must be removed outside of the clean-air atmosphere of the disc drive in order to permit installation of the disc pack into the drive and the read/write heads access to the media surfaces. Thus, prior art top-loading disc packs are not always enclosed by a protective canister, and dirt can contaminate the media as it is being installed into the drive. In some side-loading configurations, some portion of the canister protecting the disc media surface is hinged so that, as it is loaded into the drive, a door opens to permit the read/write heads access to the recording surface.

In addition to the inadequate protection of the media, prior art disc packs are inconvenient to use. The coupling between the disc pack and the drive spindle often requires substantial effort on the part of the operator to assure properly aligned engagement therebetween. As mentioned above, the cover may have to be removed for installation of the pack into the drive. Such cover must then be stored outside the drive and can collect dirt and other contaminants which can be transferred to the media when the covers are re-installed after the pack is removed from the drive.

A module for containing rotating data storage media such as disc packs, constructed according to the present invention, always capsulates the media in a dust sealed cartridge. The module can be installed into the disc drive without exposing the media to outside contaminants. The coupling between the disc pack and the drive motor spindle is provided by a magnetic chuck comprising a permanent magnet on the drive motor and chuck plate on the disc pack hub. The pack is located radially on the spindle motor nose cone by a disc pack hub flexure. The chuck plate is accessible to the permanent magnet on the drive motor by removing a cover. The cover is stored on top of the module when it is installed in the drive. When the module is not installed in the drive, the chuck plate cover is fastened in place by means of a quarter-turn fastener for easy removal and installation.

The cartridge of the media module of the present invention for housing the disc pack comprises a top cover, including a handle coupled to the disk pack hub assembly, and a bottom cover, having space for a removable chuck plate cover and having a sliding door mounted on a track for covering an opening in the side wall of the bottom cover which provides access to the media for filtered air and the read/write heads. The top cover of the cartridge also includes locating tabs which align the module in proper orientation for opening the sliding door as the module is rotated after insertion into the drive. The locating tabs also prevent inadvertent removal of the module during operation when the sliding door is open, thus minimizing contamination of the media surface and read/write heads.

When the carrying handle located in the top cover of the module is lowered into its installed or stored position, the magnetic chuck engages the hub of the disc pack with the motor spindle. When the handle is levered into the upright carrying position, the magnetic chuck releases the hub of the disc pack from the motor spindle and the entire module, including disc pack, may be counter-rotated and removed. As the module is rotated, the sliding door is closed automatically, thus minimizing exposure of the media surfaces to contamination by dirt and debris. Levering the carrying handle into the upright carrying position to remove the module from the drive also locks the disc pack hub firmly within the cartridge to prevent rotation and other movement of the media and resultant damage thereto within the module as the module is transported. After the module has been removed from the drive, the chuck plate cover is installed in position in the center of the lower cover of the module which, in turn, retains the locked position of the disc pack within the module when the carrying handle is lowered for storage of the module.

DESCRIPTION OF THE PREFERRED EMBODIMENT

Figure 1:
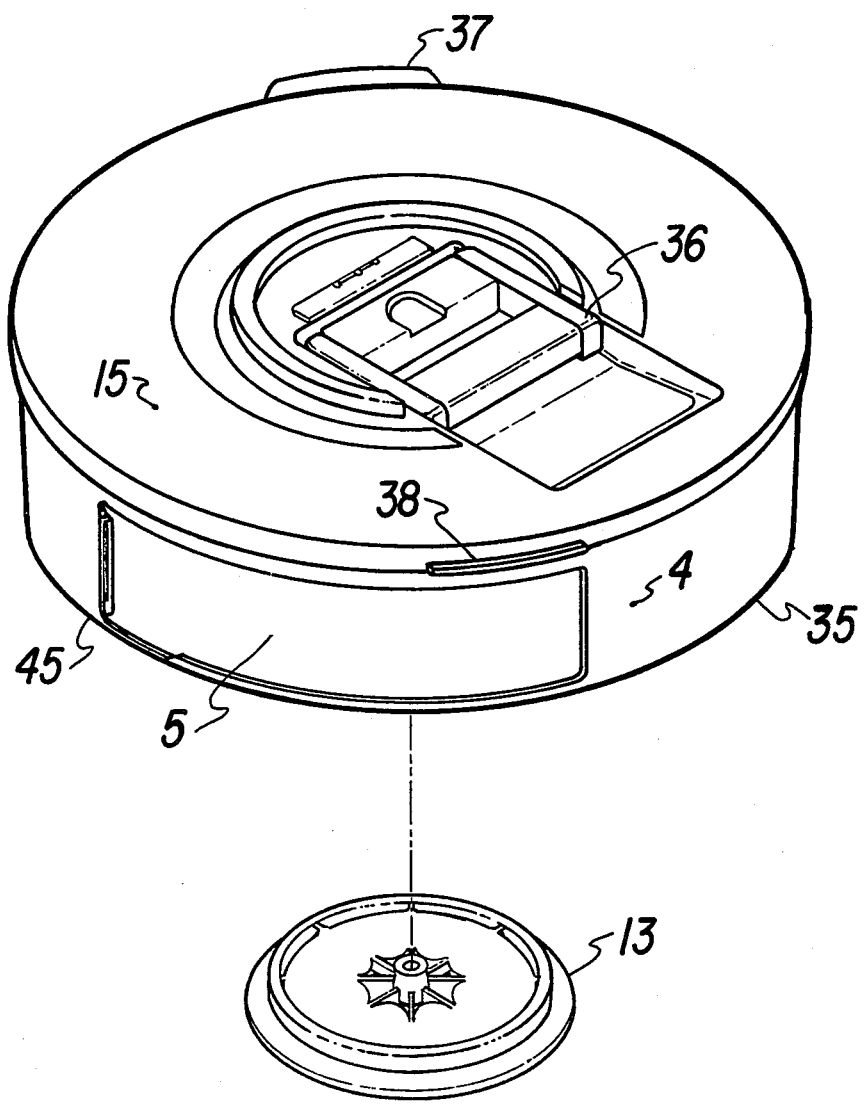
FIG. 1 is a prospective view of a media module constructed in accordance with the present invention, showing the removable chuck plate cover.
Figure 2:
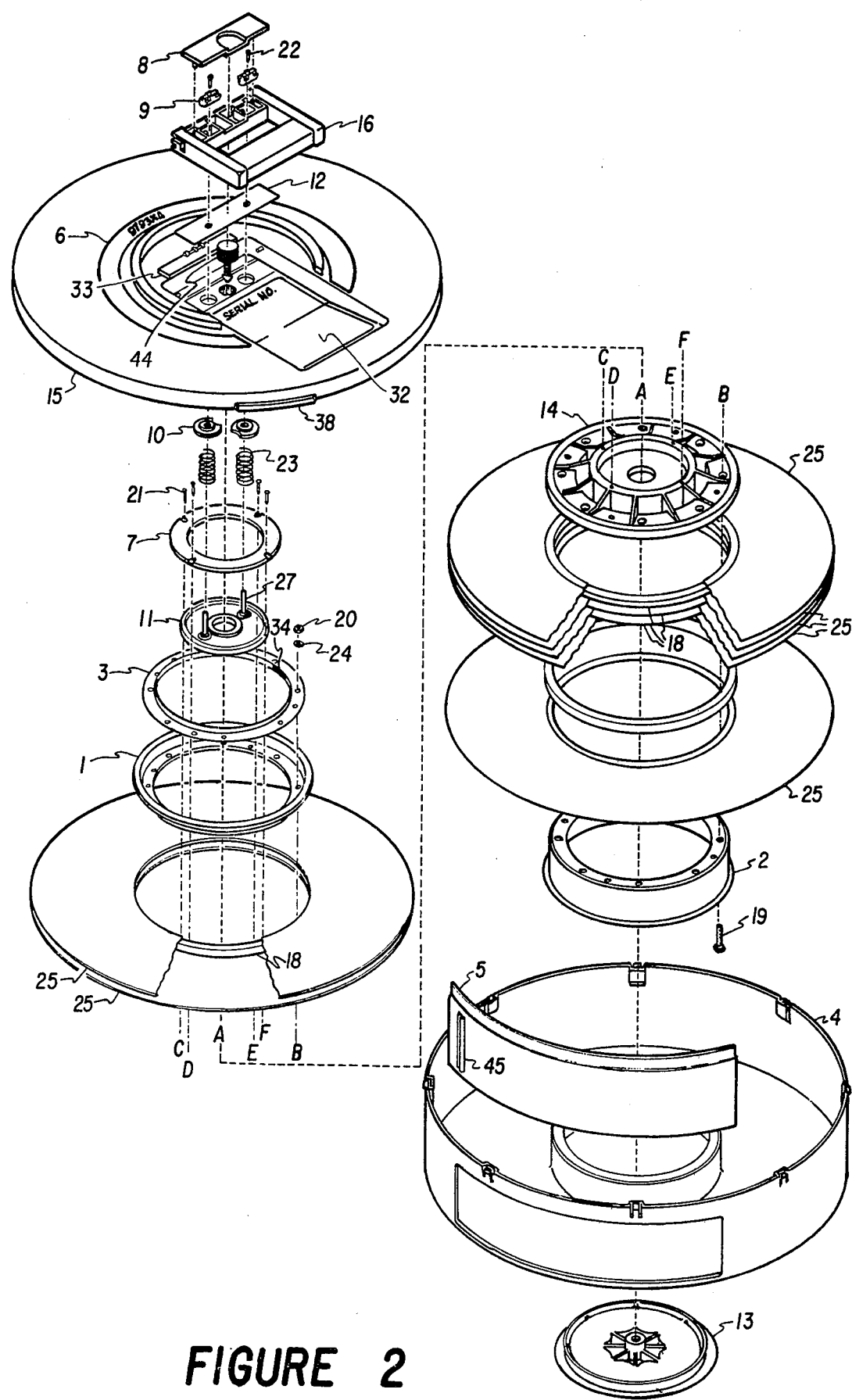
FIG. 2 is an exploded view of the media module of FIG. 1.

Referring to FIG. 1, media module 35 includes chuck plate cover 13 coupled to top cover 15. Top cover 15 forms a dust seal with bottom cover 4 when assembled as shown in FIG. 2. The periphery of top cover 15 is formed to mechanically couple to the periphery of bottom cover 4 without glue, caulk or other sealant. Bottom cover 4 includes sliding door 5 shown in more detail in FIG. 2.

Referring now to FIG. 2, handle assembly 36 is coupled to a plurality of media discs 25 by hub assembly 26, which includes media discs 25 coupled thereto by clamp rings 1 and 2 and held separate by spacer rings 18. The rim of hub assembly 14 also acts as one such spacer when assembled. Handle assembly 36 includes handle 16 coupled to hub assembly 26 by lift plate 11 which is attached to hub 14 by retainer ring 7 and associated screws 21, and which is attached to handle 16 by screws 22 which also hold pivot pins 9 in place. Suitable tension is provided by compression spring 23 and spring guides 10 which are centered on standoffs 27 on lift plate 7. Handle cover 8 cosmetically covers screws 22 and pins 9 after assembly. Chuck plate cover 13 is coupled to to cover 15 by lock stud 44.

Figure 3:
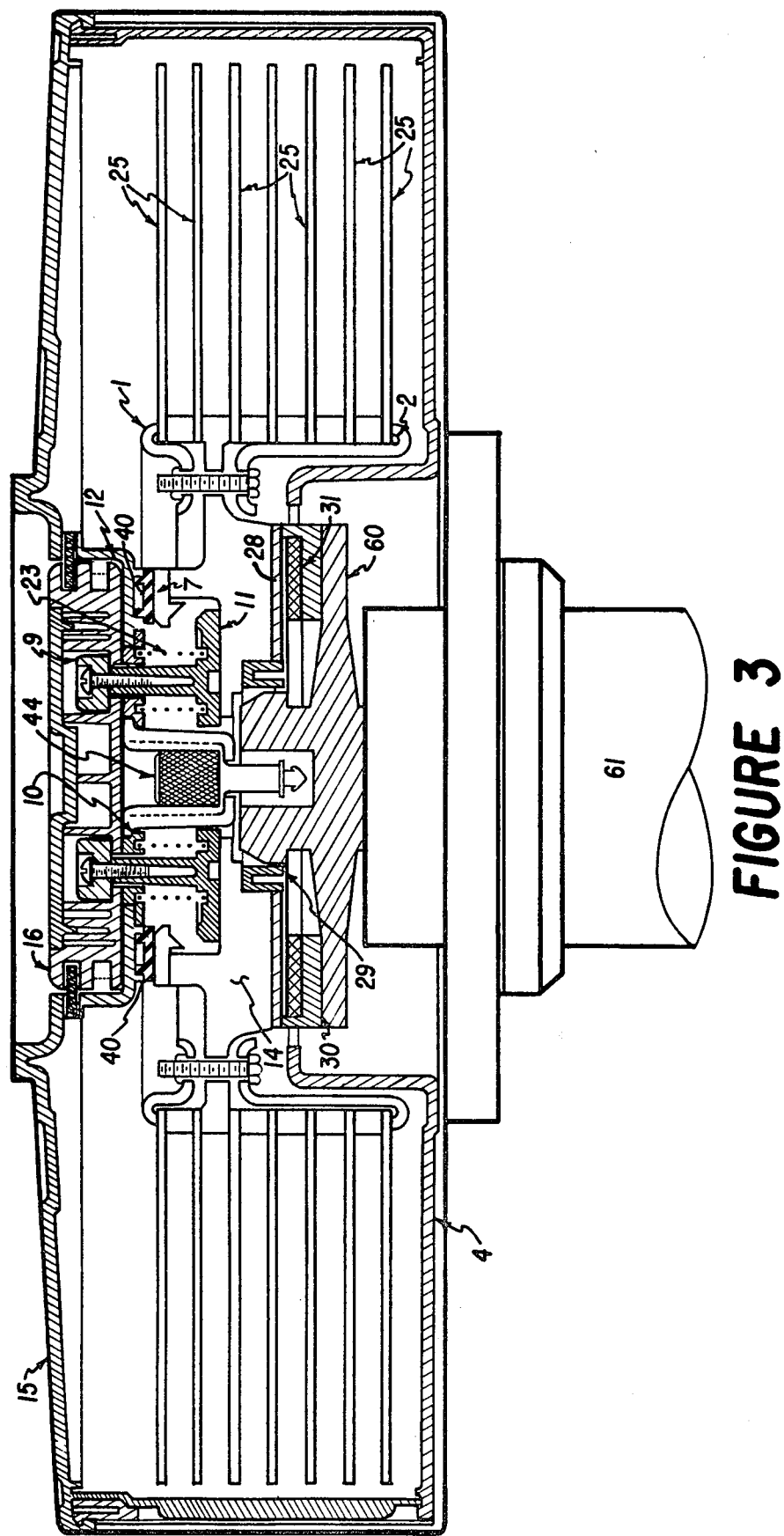
FIG. 3 is a cutaway side view of the media module of FIG. 1.

Referring to FIG. 3, rubber bumper 40 is bonded to the underside of the center portion of top cover 15 as shown. Hub assembly 26, which also includes flexure 29 and chuck plate 28, is lifted into contact with rubber bumpers 40 by pivoting handle 16 to its upright or carrying position. With the handle 16 in its upright or carrying position, the hub assembly 26 is and maintained in such contact with force sufficient to prevent rotation and other movement, including "wobbling" motion, of the hub assembly 26 and associated media discs which might otherwise occur within the module as it is being transported.

Lock stud 44 is compression bonded in the center of top cover 15 and extends through the center of hub assembly 14 to provide coupling for chuck plate cover 13. Chuck plate cover 13 includes a receiver at its hub for engaging lock stud 44 to form a "quarter fastener" for easy removal and installation. The cover is then installed by centering it on lock stud 44 and rotating it a quarter turn clockwise into locked position and removed by reversing this procedure.

Slip plate 12 is mounted between handle 16 and the top surface of cover 15 to provide friction relief for operation of handle 16. Handle 16 is shown in the installed or storage position in FIG. 2. During operation, handle 16 is levered into a vertical position orthogonal to the plane of cover 15. By such levering action, hub assembly 26 with media discs 25 attached are lifted by lift plate 11 into contact with bumpers 40 affixed to the bottom surface of cover 15 (See FIG. 3) to prevent rotation of the hub assembly during installation or removal of the media module from the disc drive. Pivot pins 9 provide a pivot around which handle 16 operates when lifted into vertical or carrying position or lowered into installed or storage position.

The media discs are always encapsulated by the cartridge formed out of top and bottom covers 15 and 4, respectively. Sliding door 5 provides access of the read/write heads and filtered air to the media discs after installation into the drive.

Referring now to FIGS. 4A through 4F, locating tabs 37 and 38 are used to index the module to the correct position as it is being inserted into the receiving chamber of the disc drive. Locating tab 38 is wider than locating tab 37 to prevent inadvertent reversal of proper indexing of the module. With handle 16 in the upright or carrying position, chuck plate cover 13 is removed by a counterclockwise quarter turn. After insertion into the disc drive receiving chamber, which automatically engages a latch with slot 45 on sliding door 5, the entire media module is rotated clockwise, about 80 degrees. Such rotation simultaneously opens sliding door 5 to expose the opening for filtered air and read/write heads and locks module 35 into the drive when locating tabs 37 and 38 rotate into glide tracks formed in the periphery of the receiving chamber of the drive.

Figure 4A:
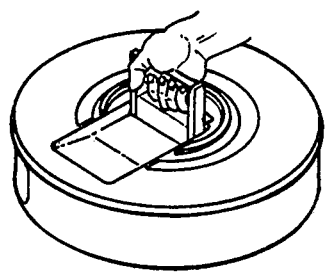
FIGS. 4A–4G illustrate, step by step, the installation of the media module of FIG. 1 into a disc drive.
Figure 4G:
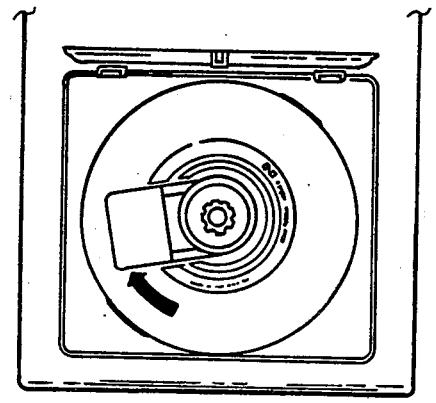
Figure 4B:
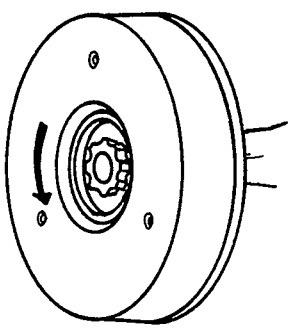
Figure 4C:
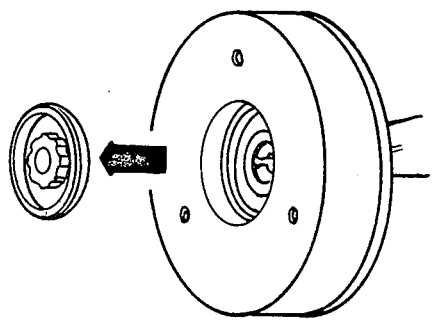
Figure 4F:
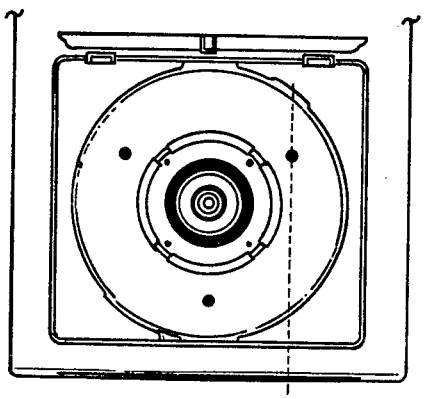
Figure 4E:
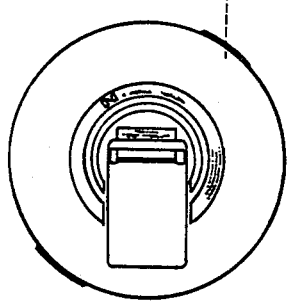
Figure 4D:
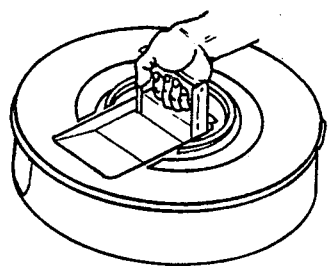

Referring again to FIG. 3, as handle 16 is lowered into installed position, hub assembly 26 will seat itself onto drive motor spindle 60. Drive motor spindle 60 includes magnetic clip 30 for containing permanent magnet 31 which is formed into a ring for engagement with chuck plate 28 attached to the bottom of hub 14. Media discs 25 are now coupled to the drive motor 61 to rotate within the module cartridge comprised of top cover 15 and bottom cover 4. Chuck plate cover 13 can be nested on the top of the media module in the rounded depression provided in top cover 15 when handle 16 is in the lowered position, as shown in FIG. 4G.

Figure 5A:
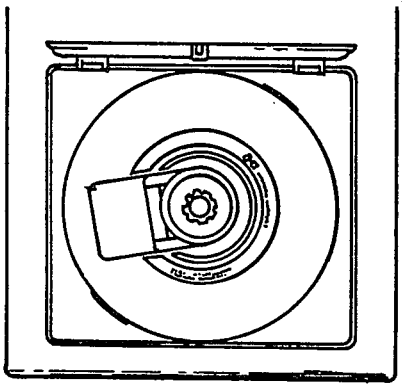
FIGS. 5A–5F illustrate, step by step, removal of the media module of FIG. 1 from a disc drive.
Figure 5D:
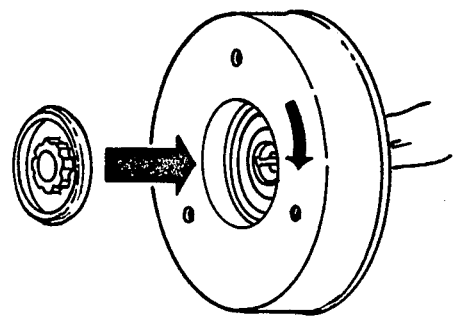
Figure 5B:
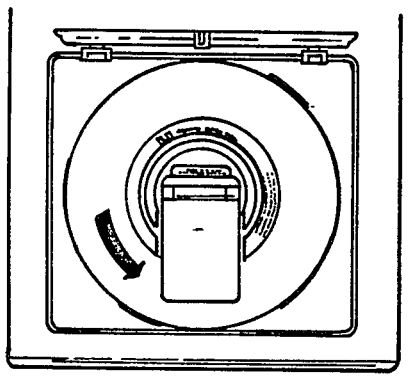
Figure 5E:
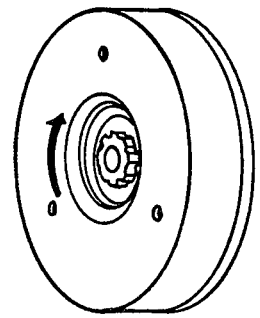
Figure 5C:
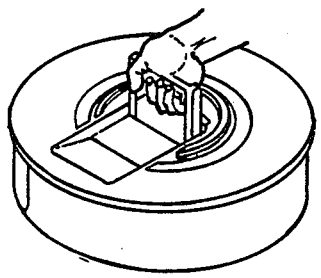
Figure 5F:
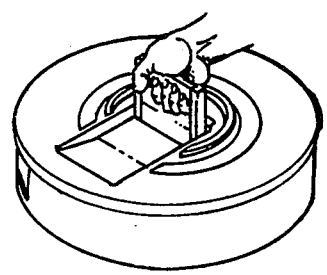

Referring finally to FIGS. 5A to 5F, to remove the media module from the drive, chuck plate cover 13 is removed from the module and handle 16 is pivoted into the upright carrying position which action lifts the chuck plate and breaks the magnetic coupling to the drive motor. Using handle 16, the module is rotated counterclockwise approximately 80 degrees simultaneously closing sliding door 5 and aligning locating tabs 37 and 38 with the slots in the receiving chamber of the drive. When properly aligned, the module may be lifted from the chamber. By positioning the media module on its side as shown in FIG. 5D, chuck plate cover 13 may be installed as described earlier in this specification. The media module is then ready for transport as shown in FIG. 5F.

We claim:

1. A module for dust-free containment of rotating data storage media and for use in a disc drive, said module comprising:
   a top cover, including a hub assembly locking means;
   a bottom cover having an annular sidewall extending upwardly from the outer periphery of said bottom cover coupled to the top cover to form a cavity;
   a hub assembly including the rotating media and a disc drive coupling means contained within the cavity formed by the top and bottom covers;
   a carrying handle having a carrying position normal to the plane of the top cover for lifting and transporting the module and for rotating said module with respect to the disc drive when the module is installed therein and a retracted position parallel to the plane of the top cover; and
   a lift plate disposed within a cavity in the upper portion of the hub assembly and coupled through the top cover to the carrying handle for engaging the hub assembly and simultaneously disengaging the disc drive coupling means from the disc drive and lifting the hub assembly into engagement with the hub assembly locking means when the carrying handle is pivoted to its carrying position.

2. A module as in claim 1 wherein:
   the disc drive includes a receiving chamber having alignment slots and guide tracks formed in the periphery of said receiving chamber;
   the module has a first position for initial placement in the receiving chamber and a second position for operation when installed in said receiving chamber; and
   the top cover includes at least one integrally molded locating tab at the outer periphery of said top cover to align the module with said alignment slots in said first position.

3. A module as in claim 2 wherein the top cover includes a plurality of integrally molded locating tabs at the outer periphery of said top cover having at least one of said locating tabs a different size than the remaining locating tabs.

4. A module as in claim 3 wherein said locating tabs move along said glide tracks when the module is rotated with respect to the disc drive from said first position to said second position, thereby preventing inadvertent removal of the handle from the disc drive when in said second position.

5. A module as in claim 2 wherein the bottom cover sidewall further includes an opening, said opening covered by a slidably mounted door which, when the module is rotated from said first position to said second position, provides access to the media by filtered air and read/write heads.

6. A module as in claim 5 wherein:
   said door includes a first engagement means; and
   said receiving chamber includes a second engagement means to operate said door.

7. A module as in claim 6 wherein said first engagement means comprises a vertical slot integrally molded in the outer surface of said door and second engagement means comprises a protrusion rigidly attached to the disc drive, said protrusion mating with said slot when the module is inserted into the disc drive receiving chamber, for opening and closing of said door when the module is rotated with respect to the disc drive when installed therein.

8. A module as in claim 1 wherein the top cover further includes a circular depression in its outer surface into which the carrying handle is recessed when pivoted to its retracted position.

9. A module as in claim 8 wherein the module further includes a chuck plate cover, removably coupled to the bottom cover, to cover the hub assembly disc drive coupling means and for fixedly engaging the hub assembly within the module with the hub assembly locking means when the carrying handle is in the retracted position.

10. A module as in claim 9 wherein the top cover further includes a fastening means which extends through the center of the hub assembly to coupled the chuck plate cover to the bottom cover.

11. A module as in claim 9 wherein:
the disc drive includes a receiving chamber; and
said chuck plate cover fits in said circular depression in the top cover for storing said chuck plate cover when the module is installed in said receiving chamber for operation.

12. A module as in claim 1 wherein the top cover hub assembly locking means comprises a rubber bumper bonded to the inside surface of said top cover to prevent movement of the disc media within the module when the hub assembly is maintained in physical contact with said rubber bumper.

13. A module as in claim 1 wherein:
the disc drive includes a disc drive motor; and
the hub assembly disc drive coupling means comprises a chuck plate for coupling the hub assembly and associated media to said disc drive motor.

14. A module as in claim 13 wherein:
the disc drive motor includes a spindle having a permanent magnet; and
said chuck plate is constructed of magnetic material for coupling to said spindle to rotate the media.

15. A module as in claim 1 wherein the module further includes a chuck plate cover, removably coupled to the bottom cover, to cover the hub assembly disc drive coupling means and for fixedly engaging the hub assembly within the module with the hub assembly locking means when the carrying handle is in the retracted position.

16. A module as in claim 15 wherein the top further includes a fastening means which extends through the center of the hub assembly to couple the chuck plate over to the bottom cover.

17. A module as in claim 15 wherein the top cover hub assembly locking means comprises a rubber bumper bonded to the inside surface of said top cover to prevent movement of the disc media within the module when the hub assembly is maintained in physical contact with said rubber bumper.

* * * * *